US011409547B2

(12) United States Patent
Chen et al.

(10) Patent No.: US 11,409,547 B2
(45) Date of Patent: Aug. 9, 2022

(54) METHOD FOR RENDERING USER INTERFACE AND TERMINAL

(71) Applicant: GUANGDONG OPPO MOBILE TELECOMMUNICATIONS CORP., LTD., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 119 days.

(21) Appl. No.: 16/992,467

(22) Filed: Aug. 13, 2020

(65) Prior Publication Data

US 2020/0371820 A1    Nov. 26, 2020

Related U.S. Application Data

(63) Continuation of application No. PCT/CN2019/076497, filed on Feb. 28, 2019.

(30) Foreign Application Priority Data

Mar. 13, 2018  (CN) .......................... 201810206376.6
Mar. 30, 2018  (CN) .......................... 201810277184.4

(51) Int. Cl.
*G06F 9/451*      (2018.01)
*G06F 11/34*     (2006.01)
(Continued)

(52) U.S. Cl.
CPC ............ *G06F 9/451* (2018.02); *G06F 9/3877* (2013.01); *G06F 9/4401* (2013.01);
(Continued)

(58) Field of Classification Search
CPC ...... G06F 9/451; G06F 9/3877; G06F 9/4401; G06F 9/44505; G06F 9/5027; G06F 11/3428; G06F 11/3433; G06F 11/3495
(Continued)

(56) References Cited

U.S. PATENT DOCUMENTS 9,471,996 B2    10/2016  Maillot et al.
2008/0271045 A1  10/2008  Le Roy et al.
(Continued)

FOREIGN PATENT DOCUMENTS

CN    102831209 A    12/2012
CN    103778656 A    5/2014
(Continued)

OTHER PUBLICATIONS

Funkhouser et al., Adaptive Display Algorithm for Interactive Frame Rates During Visualization of Complex Virtual Environments, Computer Science Division, 1993 (pp. 247-254).
(Continued)

*Primary Examiner* — John H Le
(74) *Attorney, Agent, or Firm* — Young Basile Hanlon & MacFarlane, P.C.

(57) ABSTRACT

A method for rendering a user interface and a terminal are disclosed. The method includes running a target application; obtaining a running stage in which the target application is located currently or go next; generating a rendering strategy that is adapted to the running stage; and rendering the user interface of which the target application is to be presented in the running stage through the rendering strategy.

14 Claims, 9 Drawing Sheets

(51) Int. Cl.
    *G06F 9/38*     (2018.01)
    *G06F 9/4401*     (2018.01)
    *G06F 9/445*     (2018.01)
    *G06F 9/50*     (2006.01)

(52) U.S. Cl.
    CPC ........ *G06F 9/44505* (2013.01); *G06F 9/5027* (2013.01); *G06F 11/3428* (2013.01); *G06F 11/3433* (2013.01); *G06F 11/3495* (2013.01)

(58) Field of Classification Search
    USPC .......................................................... 702/186
    See application file for complete search history.

(56) References Cited

U.S. PATENT DOCUMENTS

2012/0044251 A1     2/2012   Mark et al.
2019/0385351 A1*   12/2019   Luo ....................... G06T 19/006

FOREIGN PATENT DOCUMENTS

CN     108628652 A     10/2018
WO     2015120778 A1     8/2015

OTHER PUBLICATIONS

Extended European Search Report for EP Application 19768282.6 dated Feb. 19, 2021. (12 pages).
International search report, PCT/CN2019/076497, dated Jun. 3, 2019 (2 pages).
English translation of First Office Action from China patent office in a counterpart Chinese patent Application 201810277184.4, dated Aug. 2, 2019 (8 pages).
English translation of Second Office Action from China patent office in a counterpart Chinese patent Application 201810277184.4, dated Feb. 2, 2020 (10 pages).
Indian First Examination Report for IN Application 202017041362 dated Dec. 2, 2021. (7 pages).
Chinese Office Action with English Translation for CN Application 201810277184.4 dated May 26, 2022. (17 pages).

* cited by examiner

METHOD FOR RENDERING USER INTERFACE AND TERMINAL

CROSS-REFERENCE TO RELATED APPLICATION(S)

This application is a continuation application of International (PCT) Patent Application No. PCT/CN2019/076497, filed on Feb. 28, 2019, which claims priority to Chinese Patent Application No. 201810206376.6, filed on Mar. 13, 2018, and Chinese Patent Application No. 201810277184.4, filed on Mar. 30, 2018, the content of all of which are herein incorporated by reference in their entireties.

TECHNICAL FIELD

The present disclosure generally relates to the technical field of terminals, and in particular to a method for rendering a user interface and a terminal.

BACKGROUND

Currently, a user interface of an application that runs in the foreground in a terminal is drawn and presented in a rendering manner.

Usually, a single rendering strategy is adopted in the terminal in the process of rendering the user interface of an application, so presentation effect (such as image quality of the user interface) presented by the above application remains unchanged.

SUMMARY

According to one aspect of the present disclosure, embodiments of the present disclosure provide a method for rendering a user interface, including: running a target application; obtaining a running stage in which the target application is located currently or go next; generating a rendering strategy that is adapted to the running stage; and rendering the user interface of which the target application is to be presented in the running stage through the rendering strategy.

According to another aspect of the present disclosure, embodiments of the present disclosure provide a terminal, including a processor and a non-transitory memory, the non-transitory memory storing a computer program, when loaded and executed by the processor, causing the processor perform: running a target application; obtaining a running stage in which the target application is located currently or go next; generating a rendering strategy that is adapted to the running stage; and rendering the user interface of which the target application is to be presented in the running stage through the rendering strategy.

According to yet another aspect of the present disclosure, embodiments of the present disclosure provide a non-transitory storage medium, storing a computer program, when loaded and executed by a processor, causing the processor perform: running a target application; obtaining a running stage in which the target application is located currently or go next; generating a rendering strategy that is adapted to the running stage; and rendering the user interface of which the target application is to be presented in the running stage through the rendering strategy.

DETAILED DESCRIPTION

Figure 1:
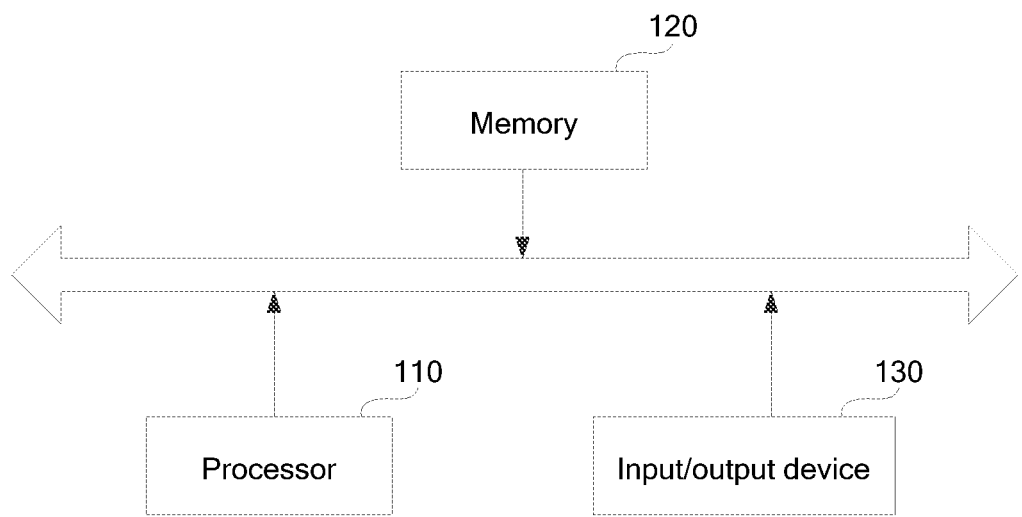
FIG. 1 is a block diagram of a terminal according to some embodiments of the present disclosure.

To make the objectives, technical solutions, and advantages of the present disclosure clearer, embodiments of the present disclosure will be described below in further details with reference to the accompanying drawings.

Embodiments of the present disclosure provides a method for rendering a user interface, including: running a target application; obtaining a running stage in which the target application is located currently or go next; generating a rendering strategy that is adapted to the running stage; and rendering the user interface of which the target application is to be presented in the running stage through the rendering strategy.

In some embodiments, the generating a rendering strategy that is adapted to the running stage includes: adjusting a currently-adopted rendering strategy according to the running stage to obtain the adjusted currently-adopted rendering strategy; rendering the user interface of which the target application is to be presented in the running stage through the adjusted currently-adopted rendering strategy; detecting whether a presentation effect of the user interface meets a preset condition; reperforming the adjusting the currently-adopted rendering strategy according to the running stage in response to the presentation effect of the user interface not meeting the preset condition; and determining the adjusted currently-adopted rendering strategy as the rendering strategy that is adapted to the running stage in response to the presentation effect of the user interface meeting the preset condition.

In some embodiments, before the obtaining a running stage in which the target application is located currently or go next, the method further includes detecting whether an abnormity appears in a presentation effect of the user interface of the target application. The obtaining the running stage is performed in response to the abnormity appearing in the presentation effect of the target application.

In some embodiments, the detecting whether an abnormity appears in a presentation effect of the user interface of the target application includes: obtaining a frame rate at which the target application is running; and detecting whether the abnormality appears in the presentation effect of the user interface of the target application according to the frame rate at which the target application is running.

In some embodiments, the frame rate is decreased during the running stage and has a decreasing speed greater than a preset speed, and the decreasing speed greater than the preset speed indicates that the abnormality appears in the presentation effect of the user interface of the target application.

In some embodiments, the target application is installed in a terminal, and the method further includes: detecting whether a utilization rate of a hardware resource of the terminal reaches a preset upper-limit value in response to the abnormality appearing in the presentation effect of the user interface of the target application. The obtaining the running stage is performed in response to the utilization rate reaching the preset upper-limit value.

In some embodiments, after the generating a rendering strategy that is adapted to the running stage, the method further includes storing the running stage and a relationship between the running stage and the rendering strategy that is adapted to the running stage.

In some embodiments, the obtaining a running stage in which the target application is located currently or go next includes: obtaining the running stage through a data channel established with the target application.

In some embodiments, the data channel is established in a Binder manner by which the target application calls an embedded software development kit (SDK) with an operating system; or the data channel is a long connection established between the target application and the operating system in a Socket manner.

In some embodiments, the running stage is determined according to at least one of a running duration of the target application and contents in the user interface presented by the target application.

Embodiments of the present disclosure provides a terminal, including a processor and a non-transitory memory, the non-transitory memory storing a computer program, when loaded and executed by the processor, causing the processor perform running a target application; obtaining a running stage in which the target application is located currently or go next; generating a rendering strategy that is adapted to the running stage; and rendering the user interface of which the target application is to be presented in the running stage through the rendering strategy.

In some embodiments, the obtaining the running stage is performed in response to an abnormality appearing in the presentation effect of the target application.

In some embodiments, the abnormality appearing in the presentation effect of the user interface of the target application is determined according to the frame rate at which the target application is running.

In some embodiments, the frame rate is decreased during the running stage and has a decreasing speed greater than a preset speed, and the decreasing speed greater than the preset speed indicates that the abnormality appears in the presentation effect of the user interface of the target application.

In some embodiments, the terminal has a hardware resource; and the obtaining the running stage is performed in response to the abnormality appearing in the presentation effect of the target application and a utilization rate of the hardware resource reaching a preset upper-limit value.

In some embodiments, the running stage and a relationship between the running stage and the rendering strategy that is adapted to the running stage are stored in the non-transitory memory.

In some embodiments, the running stage is obtained through a data channel established with the target application.

In some embodiments, the data channel is established in a Binder manner by which the target application calls an embedded software development kit (SDK) with an operating system; or the data channel is a long connection established between the target application and the operating system in a socket manner.

In some embodiments, the running stage is determined according to at least one of a running duration of the target application and contents in the user interface presented by the target application.

Embodiments of the present disclosure provides a non-transitory storage medium, storing a computer program, when loaded and executed by a processor, causing the processor perform running a target application; obtaining a running stage in which the target application is located currently or go next; generating a rendering strategy that is adapted to the running stage; and rendering the user interface of which the target application is to be presented in the running stage through the rendering strategy.

FIG. 1 shows a block diagram of a terminal according to some embodiments of the present disclosure. The terminal may be an electronic device that can run an application, for example, a smart phone, a tablet computer, an e-book. The terminal in the present disclosure may include one or more of the following components: a processor 110, a memory 120, and an input/output device 130.

The processor 110 may include one or more processing cores. The processor 110 is connected to various parts of the entire terminal using various interfaces and lines, and executes various functions and data-processing of the terminal 100 by running or executing instructions, programs, code sets or instruction sets stored in the memory 120 and calling data stored in the memory 120. Alternatively, the processor 110 may be implemented by at least one of a digital signal processing (DSP), a field programmable gate array (FPGA), and a programmable logic array (PLA). The processor 110 may be integrated with one or a combination of a central processing unit (CPU), a Graphics Processing Unit (GPU), a modem, and the like. The CPU mainly deals with an operating system, user interfaces, applications, etc. The GPU is used for rendering and drawing displayed contents. The modem is used for wireless communication. It can be understood that the above-mentioned modem may not be integrated into the processor 110, and may be implemented by a communication chip alone.

The memory 120 may include a random access memory (RAM) or read-only memory (ROM). Alternatively, the memory 120 includes a non-transitory computer-readable storage medium. The memory 120 may be used to store instructions, programs, codes, code sets, or instruction sets. The memory 120 may include a program-storage area and a data-storage area. The program-storage area may store instructions for implementing an operating system and instructions for implementing at least one function (such as a touch function, a sound playback function, an image playback function, etc.), instructions for implementing the following method embodiments. The operating system may be an Android system (including a system based on the Android system development), an IOS system developed by Apple (including a system based on IOS system development), or other systems. The data-storage area can also store data (such as phonebook, audio and video data, chat history data) created when the terminal is in use.

The memory 120 can be divided into an operating system space and a user space. The operating system runs in the operating system space, and native and third-party applications run in the user space. In order to ensure that different third-party applications can have a better running effect, the operating system allocates corresponding system resources for different third-party applications. However, different application scenarios in the same third-party application also have different requirements for system resources. For example, in a scenario of loading local resources, the third-party application has higher requirements for disk-read speed. In a scenario of rendering an animation, the three-party application has higher requirements for GPU performance. However, the operating system and the third-party application are independent of each other. The operating system often fails to perceive the current application scenario of the third-party application in time, so that the operating system cannot allocate targeted system resources according to specific application scenarios of the third-party application.

Figure 2:
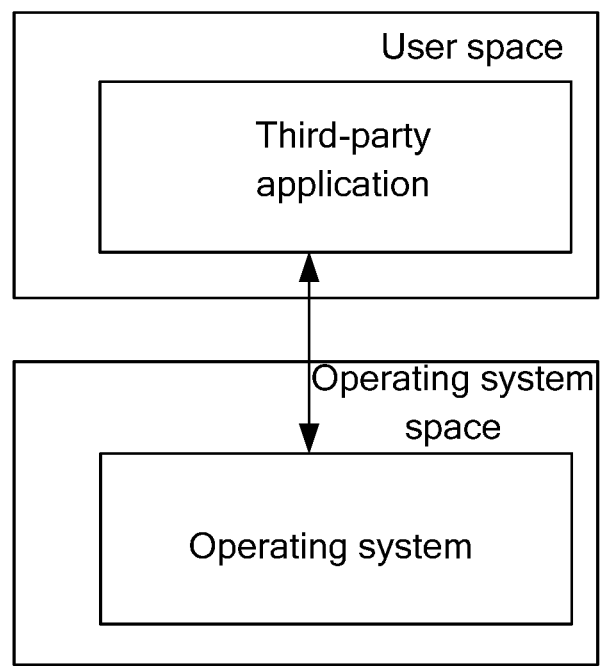
FIG. 2 shows a schematic diagram of a communication between an operating system and a third-party application.

As shown in FIG. 2, in order for the operating system to distinguish the specific application scenarios of a third-party application, it is necessary to establish a data communication between the third-party application and the operating system, so that the operating system can obtain information of a current scenario of the third-party application at any time and then allocates targeted system resources based on the current scenario.

Figure 3:
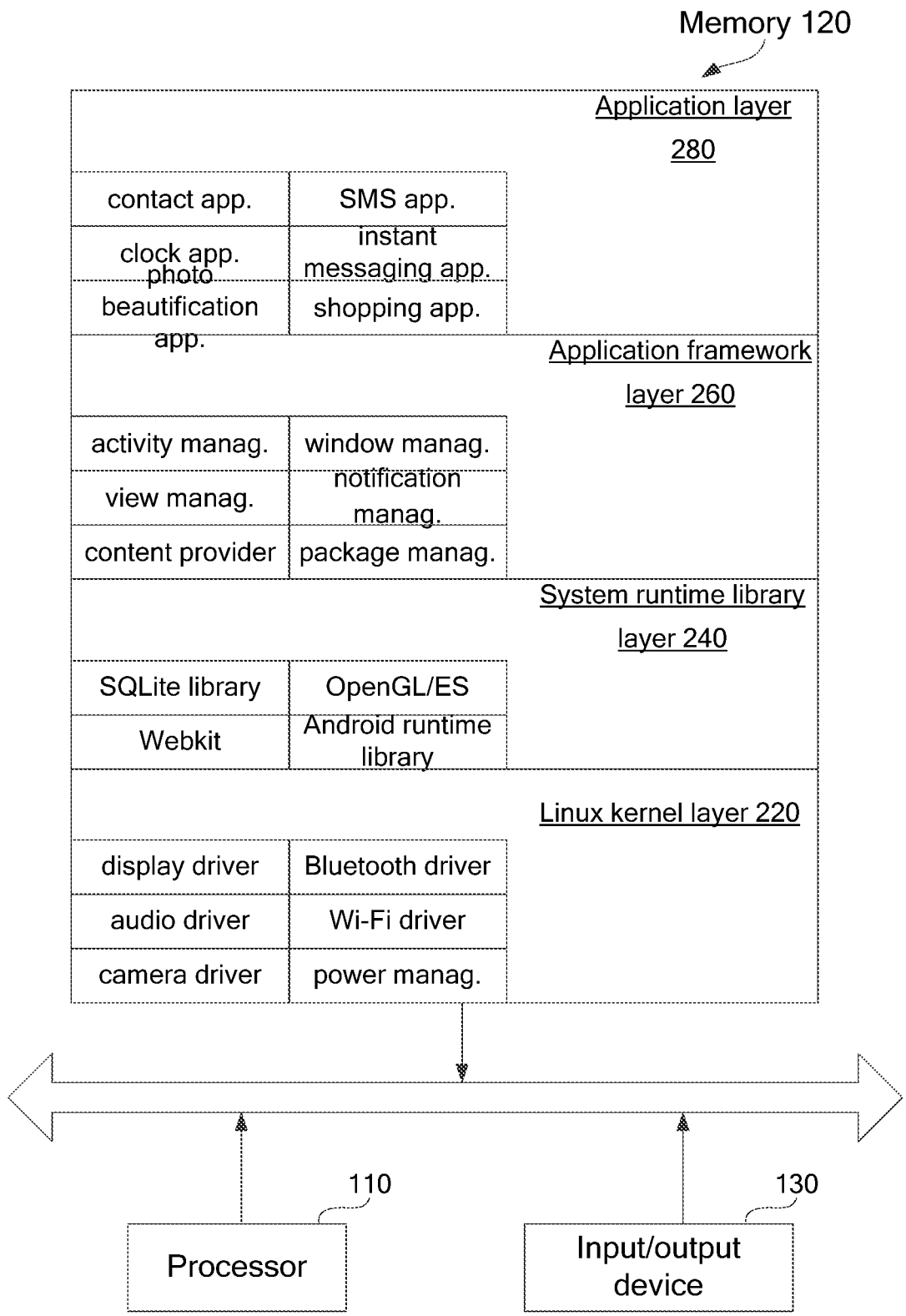
FIG. 3 is a schematic diagram of an operating system according to some embodiments of the present disclosure.

Taking the Android operating system as an example, programs and data stored in the memory 120 are shown in FIG. 3, and the memory 120 may store a Linux kernel layer 220, a system runtime library layer 240, an application framework layer 260, and an application layer 280. The Linux kernel layer 220, the system runtime library layer 240, and the application framework layer 260 belong to the operating system space, and the application layer 280 belongs to the user space. The Linux kernel layer 220 provides low-level drivers for various hardwares of the terminal 100, such as a display driver, an audio driver, a camera driver, a Bluetooth driver, a Wi-Fi driver, and power management. The system runtime library layer 240 provides major feature supports for the Android system through some C/C++ libraries. For example, the SQLite library provides supports for database, the OpenGL/ES library provides supports for 3D drawing, and the Webkit library provides supports for browser kernel. An Android runtime library is also provided in the system runtime library layer 240, which mainly provides some core libraries that can allow developers to programming Android applications using the Java language. The application framework layer 260 provides various APIs that may be used when programming applications, and developers can also use these APIs to programming their own applications, such as an API of activity management, an API of window management, an API of view management, an API of notification management, an API of content provider, an API of package management, call management, an API of resource management, an API of positioning management. At least one application runs in the application layer 280, and these applications may be native applications programmed in the operating system, such as a contact application, an SMS application, a clock application, a camera application, etc., or may be third-party applications developed by a third-party developer, such as game applications, instant messaging applications, photo beautification applications, shopping applications, etc.

Figure 4:
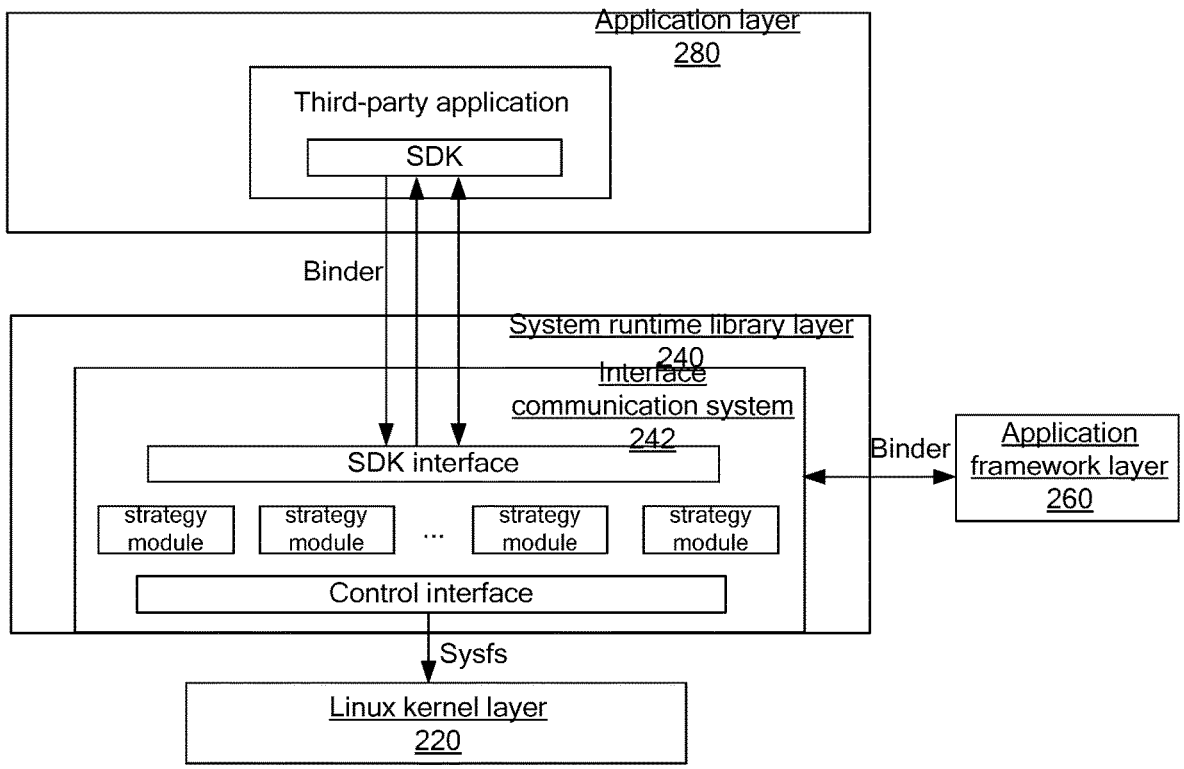
FIG. 4 shows a schematic diagram of a communication between another operating system and a third-party application.

A feasible communication mode between the operating system and a third-party application is shown in FIG. 4, and a software development kit (SDK) for communicating with the operating system is embedded in the third-party application.

The SDK includes a number of abstract Application Programming Interfaces (APIs). The SDK is provided by an operating system developer to a third-party application developer, and the third-party application developer embeds the SDK into the third-party application. The third-party application is installed and runs after the operating system, and then can call the APIs provided by the SDK to communicate with the operating system.

As shown in FIG. 4, the system runtime library layer 240 may additionally include an interface communication system 242. The interface communication system 242 can be regarded as a subsystem in the operating system, or as an application embedded in the operating system. The interface communication system 242 includes an SDK interface, and a third-party application calls the APIs of the embedded SDK and then performs data communication with the SDK interface in a Binder manner. In this way, data related to application scenarios of the third-party application can be transferred to the operating system through the SDK. With the embedded SDK, the operating system can also actively transfer data to the third-party application, or two-way data transmission can be performed between the operating system and the third-party application.

Figure 5:
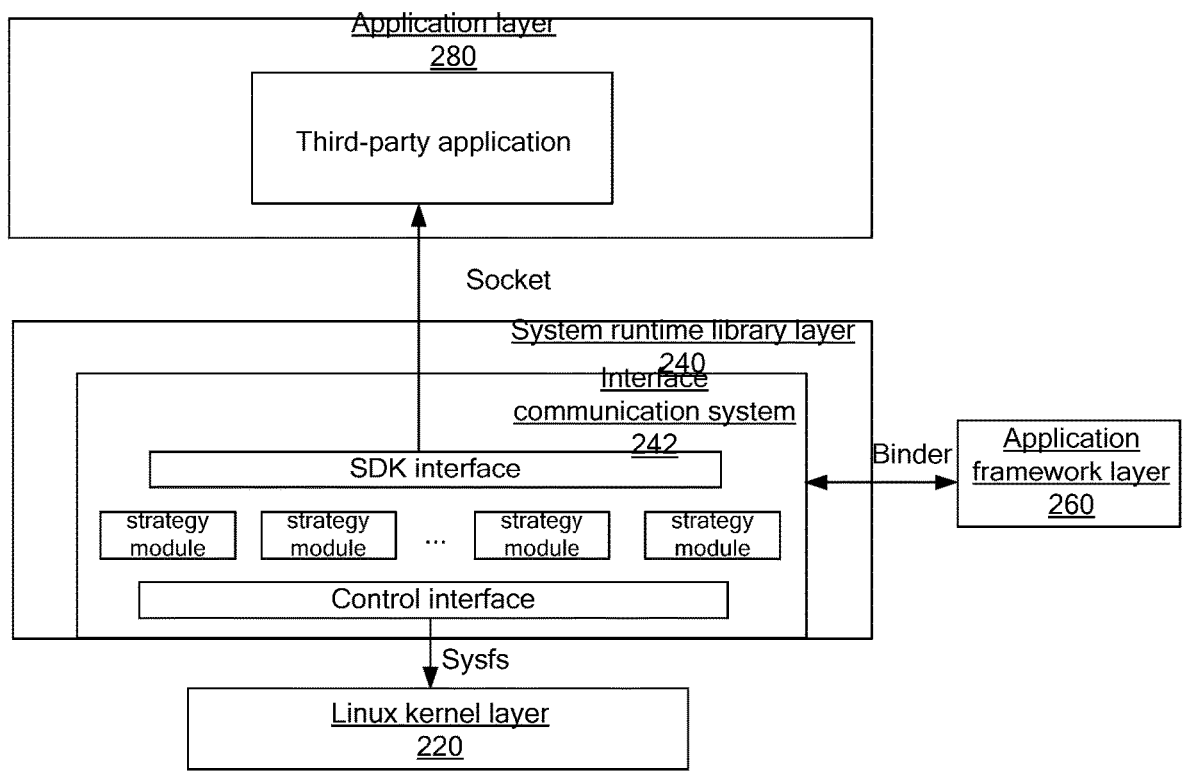
FIG. 5 shows a schematic diagram of a communication between another operating system and a third-party application.

In another feasible communication mode, as shown in FIG. 5, a third-party application can also establish a long connection with a Socket interface of the interface communication system 242 by using a Socket manner. The data related to application scenarios of the third-party application can be transferred to the operating system through the long connection.

As shown in FIGS. 4 and 5, the interface communication system 242 includes different strategy modules. After receiving data sent by a third-party application, the interface communication system 242 uses a strategy module corresponding to the third-party application to analyze the data to obtain a corresponding strategy for resource allocation optimization. Based on the obtained strategy for resource allocation optimization, the interface communication system 242 notifies the Linux kernel layer 220 through a control interface to perform system resource allocation optimization. The control interface can communicate with the Linux kernel layer 220 through the Sysfs.

Alternatively, different strategy modules in the interface communication system 242 can correspond to different third-party applications (that is, a strategy module is set for a respective application), different strategy modules correspond to different types of third-party applications (that is, a strategy module is set for a respective type of application), different strategy modules may correspond to different system resources (that is, a strategy module is set for a respective system resource), or different strategy modules may correspond to different application scenarios (that is, a strategy module is set for a respective application scenario). The specific setting of the strategy modules is not limited in embodiments of the present disclosure.

The interface communication system 242 can also communicate with the application framework layer 260 in the Binder manner to receive information of foreground applications sent from the application framework layer 260. Thus, based on the information of foreground applications, system resource optimization is performed for only the third-party applications currently running in the foreground.

Figure 6:
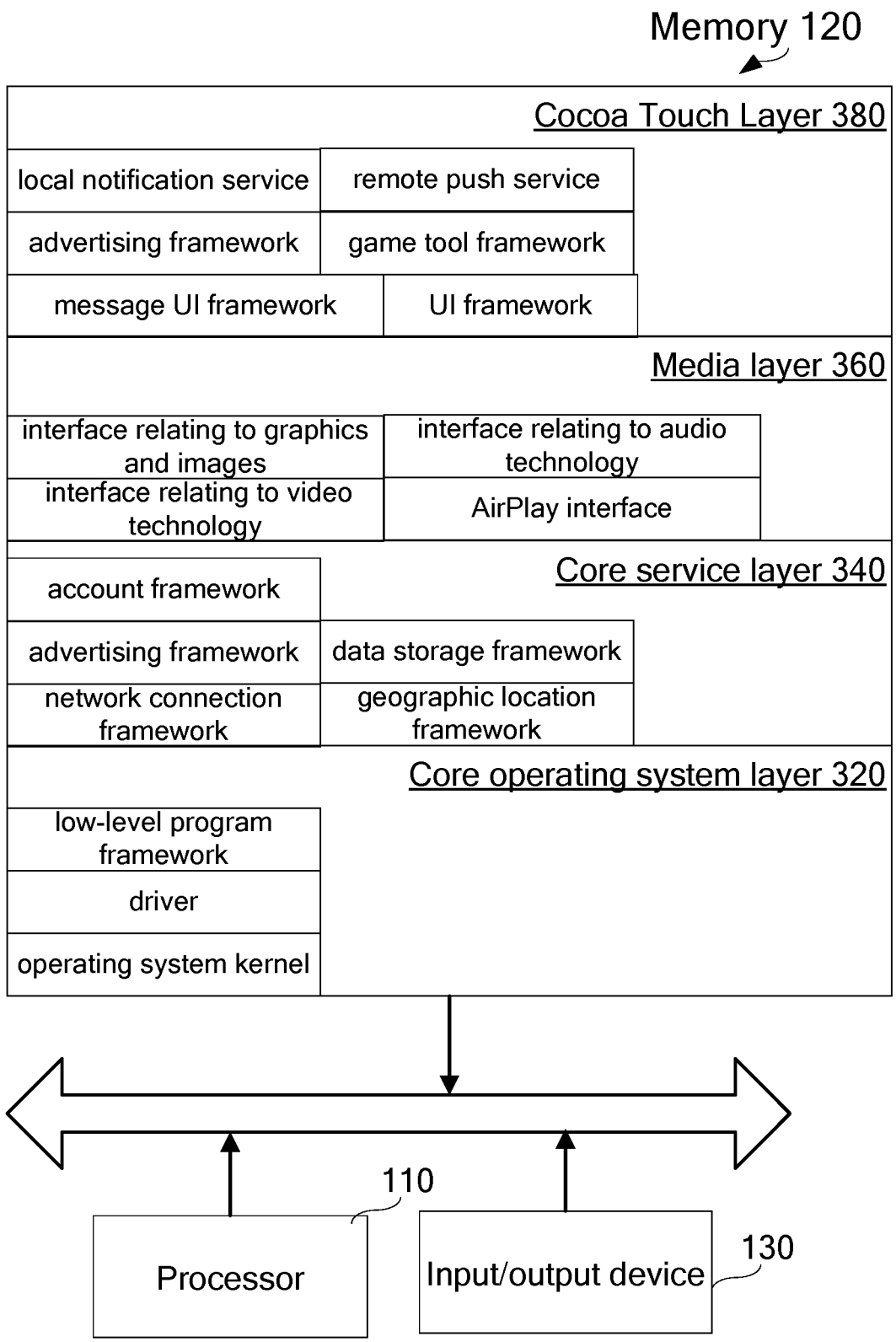
FIG. 6 is a schematic diagram of an operating system according to another some embodiments of the present disclosure.

Taking the operating system being an IOS system as an example, programs and data stored in the memory 120 are shown in FIG. 6. The IOS system includes a core operating system layer 320, a core service layer 340, and a media layer 360, and a Cocoa Touch Layer 380. The core operating system layer 320 includes an operating system kernel, drivers, and low-level program frameworks. These low-level program frameworks provide functions being more approximate to the hardware, which are provided for program frameworks in the core service layer 340. The core service layer 340 provides system services and/or program frameworks required by applications, such as a foundation framework, an account framework, an advertising framework, a data storage framework, a network connection framework, a geographic location framework, a sports framework, and the like. The media layer 360 provides audio-visual interfaces for applications, such as an interface relating to graphics and images, an interface relating to audio technology, an interface relating to video technology, and an AirPlay interface for audio and video transmission technology. The Cocoa Touch layer 380 provides frameworks relating to various commonly-used interfaces for application development. The Cocoa Touch layer 380 is responsible for user's touch interaction operations on the terminal 100, such as a local notification service, a remote push service, an advertising framework, a game tool framework, a message user interface (UI) framework, a user interface UIKit framework, a map framework, etc.

In the framework shown in FIG. 6, frameworks related to most applications include, but are not limited to, the foundation framework in the core service layer 340 and the UIKit framework in the Cocoa Touch layer 380. The foundation framework provides many basic object-classes and datatypes and provides the most basic system services for all applications, regardless of the UI. Classes provided by the UIKit framework is a basic UI class library for creating a touch-based user interface. IOS applications can provide UIs based on the UIKit framework. Therefore, the UIKit framework provides a basic architecture of an application and is used for building user interfaces, drawing and handling interaction events, responding to gestures, etc.

The mode and principle of data communication between a third-party application and the operating system in the IOS system can refer to that in the Android system, which will not be repeated here.

The input/output device 130 may include a touch display screen for receiving a user's touch operation thereon or therenear from any suitable object such as a finger, a touch pen, and for displaying user interfaces of various applications. The touch display screen is usually set at the front of the terminal. The touch display screen can be designed as a full screen, curved screen, or special-shaped screen. The touch display screen can also be designed as a combination of a full screen and a curved screen, and a combination of a special-shaped screen and a curved screen, which is not limited in embodiments of the present disclosure.

In addition, those skilled in the art may understand that the structure of the terminal shown in the above drawings does not constitute a limitation on the terminal, and the terminal may include more or fewer parts than that as shown in drawings, combine certain parts, or have different component arrangements. For example, the terminal also includes components such as a radio frequency circuit, an input unit, a sensor, an audio circuit, a wireless fidelity (Wi-Fi) module, a power supply, and a Bluetooth module, which will not be described here.

In the related art, the rendering strategy used by the terminal is relatively simple. To solve this, embodiments of the present disclosure provide a method and an apparatus for rendering a user interface and a terminal. In the method according to embodiments of the present disclosure, a running stage where an application is currently located or will enter next is obtained, and then a rendering strategy adapted to the above-mentioned running stage is adopted to render a user interface presented in the above-mentioned running stage. Therefore, the rendering strategy is dynamically adjusted in different running stages, and different presentation effects are accordingly presented, which improves controllability and flexibility of interface rendering.

In embodiments of the present disclosure, the execution subject of various actions/operations may be the terminal as described above. Alternatively, the execution subject of various actions/operation is the operating system in the terminal. The operating system may be an Android system, an IOS system, or other operating systems, which are not limited in the embodiments of the present disclosure.

In the following method embodiments, in order to describe conveniently, only an example in which the execution body of various actions/operation is the terminal is described.

Figure 7:
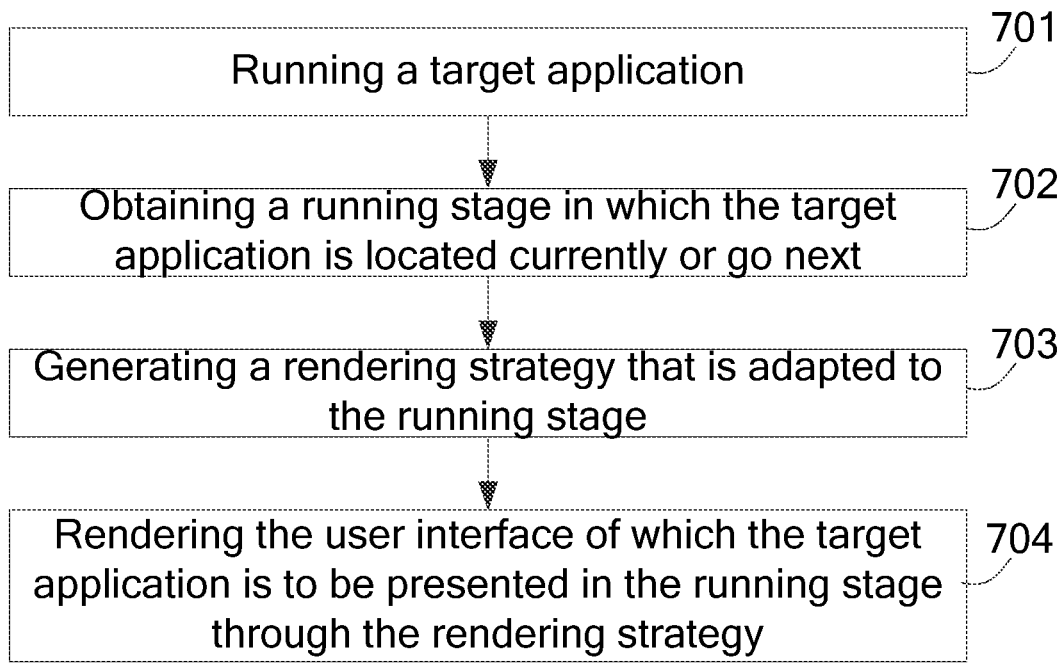
FIG. 7 is a flowchart of a method for rendering a user interface according to some embodiments of the present disclosure.

FIG. 7 shows a flowchart of a method for rendering a user interface according to some example embodiments of the present disclosure. The method may include actions/operations in the following blocks.

At block 701, the method runs a target application.

The target application is any application installed in the terminal. The target application can be a native application in the operating system, such as a contact application, SMS application, clock application, camera application, etc., or can be a third-party application developed by a third-party developer, such as a game application, video application, shopping application, etc., which is not limited in the embodiments of the present disclosure. Alternatively, the target application is a game application.

In some examples, when receiving a trigger signal corresponding to an identifier (e.g., an icon, a name, etc.) of the target application, the terminal runs the target application in the foreground. The trigger signal may be any one of a single-click signal, a double-click signal, a long-press signal, and a voice signal, which is not limited in the embodiments of the present disclosure. The target application runs in the user space.

At block 702, the method obtains a running stage in which the target application is located currently or go next.

An application may include several different running stages, and a running stage refers to a duration in which the application runs.

Alternatively, an application has multiple running stages divided according to running durations, and the running durations included in these running stages may be the same or different. Table 1 shows running durations corresponding to various running stages, where each operation stage has a running duration, i.e. 15 minutes.

TABLE 1

| Running stages | Running durations |
| --- | --- |
| First stage | 0-15 minutes |
| Second stage | 15-30 minutes |
| Third stage | 30-45 minutes |
| ... | ... |

Alternatively, each running stage is determined according to contents in the user interface presented by the application. The dividing manner for running stages is described with using the target application being a game application as an example. In the game application, the running stages may include a boot-loading stage, a team-battle stage, a personal-battle stage, a mirror-opening stage, etc., which are not limited in the embodiments of the present disclosure.

When the target application is in the boot-loading stage, the user interface displayed in the terminal includes an animation which the target application plays within a first preset duration after starting and running. When the target application is in a team-battle stage, the number of virtual characters included in the user interface displayed in the terminal is greater than a first preset number. When the target application is in the personal-battle stage, the number of virtual characters included in the user interface displayed in the terminal is less than a second preset number. When the target application is in the mirror-opening stage, the user interface displayed in the terminal may be enlarged by a preset multiple within a second preset duration. The first preset duration, the first preset number, the second preset number, the second preset duration, and the preset multiple can all be preset according to actual needs, which are not limited in the embodiments of the present disclosure.

The next running stage of the target application, i.e. the running stage that the target application go next, refers to a running stage that the target application will enter within a set time. In a case where the running stages are determined according to the running duration of the target application, each running stage of the target application may be determined according to the running time corresponding to each running stage and the running duration of the target application. As shown in above Table 1, if the target application has been running for 13 minutes, the target application is currently in the first stage, and a next stage of the target application is the second stage.

In a case where the running stages are determined according to contents in the user interface presented by an application, the running stage in which the target application is located currently, which is also called as the current running stage, can be determined by the target application after obtaining relevant interface files. The relevant interface files include contents of the user interface to be presented in the current running stage or next running stage of the target application. For the current running stage of the target application, it can also be obtained as the target application obtains the currently presented user interface and identifies the user interface.

After determining the current running stage or the next running stage, the target application notifies the current running stage or the next running stage to the operating system. For example, the target application sends stage-information to the operating system, and the stage-information is used to indicate that the current running stage or the next running stage of the target application.

Alternatively, the terminal obtains the current running stage or the next running stage of the target application from the target application through a data channel established with the target application.

In embodiments of the present disclosure, a data channel is established between the operating system in the terminal and the target application, so as to realize data interaction between the operating system and the target application. In some possible implementations, the data channel is established in a Binder manner by which the target application calls an embedded software development kit (SDK) with an operating system. Alternatively, the data channel is established in the Binder manner as the target application calls the embedded SDK that is with the SDK interface in the operating system when starting to run. In another some possible implementations, the data channel is a long connection established between the target application and the operating system in Socket manner. Optionally, the data channel is a long connection that the target application establishes with a Socket interface in the operating system in the Socket manner when starting to run.

At block 703, the method generates a rendering strategy that is adapted to the running stage.

The rendering strategy includes a rendering mode and/or rendering parameters. The rendering mode refers to a method in which a user interface is rendered. The rendering mode may include once-rendering by multiple light-sources, multiple-rendering by multiple light-sources, delayed shading, etc., which is not limited in the embodiments of the present disclosure. Different rendering modes require different hardware resources of the terminal, rendering efficiency, and presentation effects. In some embodiments of the present disclosure, multiple rendering modes are stored in the terminal to meet different needs of users. The rendering parameters refer to parameters with which the user interface is rendered, such as resolution, the number of RGB color channels, and so on, which are not limited in the embodiments of the present disclosure.

Alternatively, when the user interface to be presented by the target application in a running stage is rendered through a certain rendering strategy, if presentation effect of the user interface of the target application meets a preset condition, the rendering strategy may be referred to as the rendering strategy that is adapted to the running stage.

At block 704, the method renders the user interface of which the target application is to presented in the running stage through the rendering strategy.

After the terminal finishes rendering the user interface, the terminal presents the user interface.

To sum up, in the technical solution according to the embodiments of the present disclosure, the running stage in which the target application is located currently or go next is obtained, and then the user interface to be presented in the above running stage is rendered through a rendering strategy that is adapted to the above running stage. Thus, the rendering strategy can be dynamically adjusted at different running stages, and different presentation effects are accordingly presented, which improves the controllability and flexibility of interface rendering.

Figure 8:
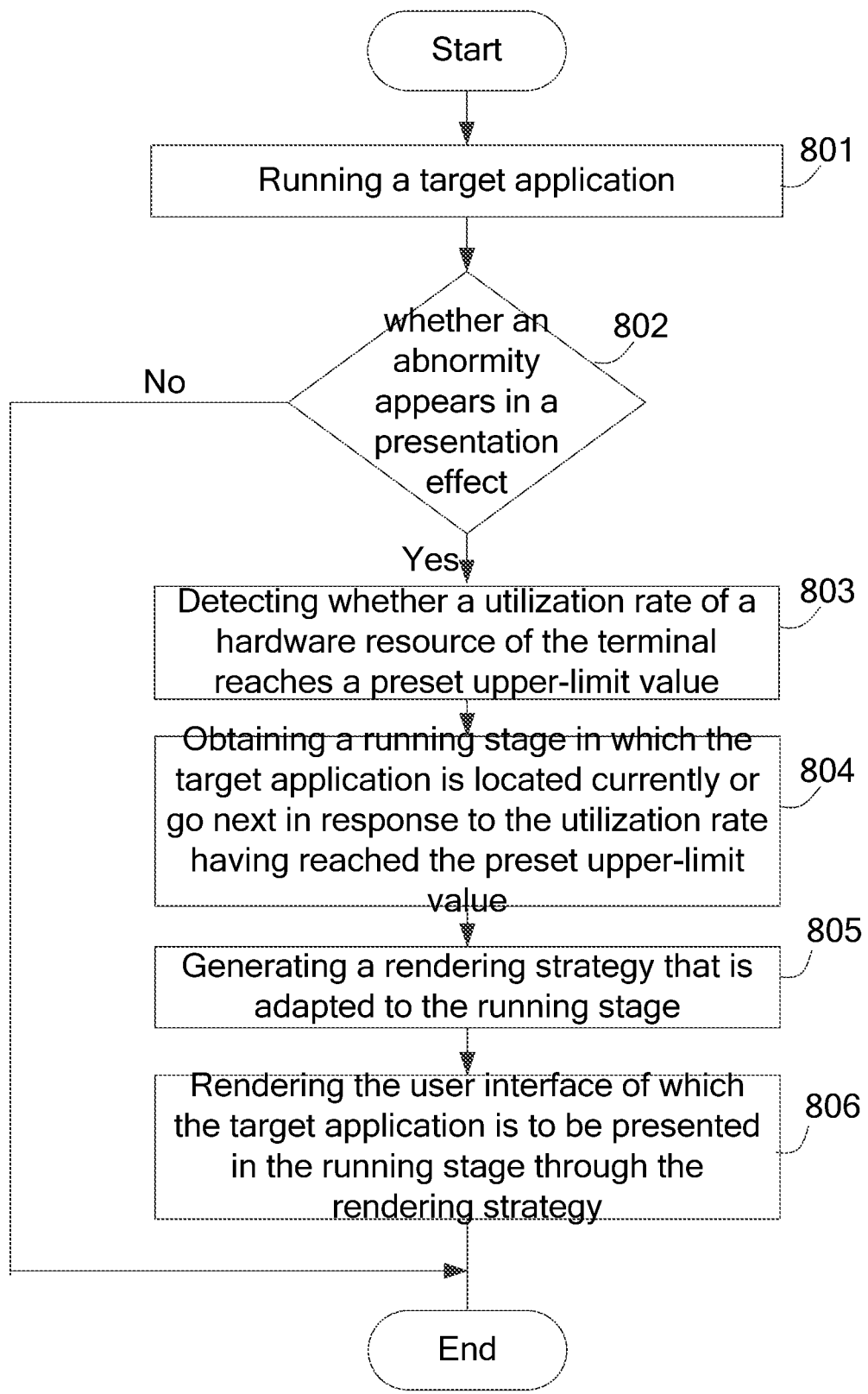
FIG. 8 is a flowchart of a method for rendering a user interface according to another some embodiments of the present disclosure.

FIG. 8 shows a flowchart of a method for rendering a user interface according to another some example embodiments of the present disclosure. The method may include actions/operations in the following blocks.

At block 801, the method runs a target application.

At block 802, the method detects whether an abnormity appears in a presentation effect of the user interface of the target application.

In some embodiments of the present disclosure, when an abnormity appears in the presentation effect of the user interface of the target application, the terminal performs subsequent step of obtaining the running stage in which the target application is located currently or go next. Thus, this can avoid a continuous abnormality in the presentation effect of the user interface of the target application. In embodiments of the present disclosure, the abnormality is for the presentation effect of the user interface of the target application, and the abnormality may include a phenomenon of stagnant, slow or jumped switching of the user interface, a phenomenon of a failed match between the user interface and sounds, and a phenomenon of smeared content in the user interface.

Alternatively, the terminal firstly obtains a frame rate at which the target application is running, and then detects whether an abnormality appears in the presentation effect of the user interface of the target application according to the frame rate at which the target application is running.

In some examples, the terminal detects whether the frame rate of the target application is less than a preset frame rate, and thus determines whether an abnormality appears in the presentation effect of the user interface of the target application. If the frame rate of the target application is detected to be less than the preset frame rate, it is determined that an abnormality appears in the presentation effect of the user interface of the target application. If the frame rate of the target application is detected to be equal to the preset frame rate, it is determined that an abnormality does not appear in the presentation effect of the user interface of the target application. The above-mentioned preset frame rate can be customized by the user, or can be customized by the target application. For example, the preset frame rate is 30 frames per second or 60 frames per second.

In another some examples, the terminal detects whether the frame rate at which the target application is running decreases, and thus determines whether the presentation effect of the user interface of the target application has an abnormality. If the frame rate of the target application is detected to be decreased, it is determined that an abnormality appears in the presentation effect of the user interface of the target application. If the frame rate of the target application is detected to be unchanged, it is determined that an abnormality does not appear in the presentation effect of the user interface of the target application. Alternatively, the terminal obtains a frame rate of the target application every preset period, and compares a currently-obtained frame rate of the target application with a previously-obtained frame rate of the target application. Thus, whether the frame rate of the target application decreases may be detected. If the currently-obtained frame rate of the target application is less than the previously-obtained frame rate of the target application, the frame rate of the target application decreases, and an abnormality appears in the presentation effect of the user interface of the target application. If the currently-obtained frame rate of the target application is equal to the previously-obtained frame rate of the target application, the frame rate of the target application decreases, and an abnormality does not appear in the presentation effect of the user interface of the target application.

In another some examples, the terminal detects whether the frame rate of the target application has a decreasing speed greater than a preset speed, and thus determines whether an abnormality appears in the presentation effect of the user interface of the target application. The preset speed may be set according to experiments or experience, which is not limited in the embodiments of the present disclosure. Specifically, the terminal obtains a frame rate of the target application every preset period, calculates the decreasing speed of the frame rate of the target application according to a difference between the currently-obtained frame rate of the target application and the previously-obtained frame rate of the target application and a time interval between these twice obtaining, and compares the decreasing speed with the preset speed. Thus, whether the decreasing speed of the frame rate of the target application is greater than the preset speed may be detected. If the decreasing speed of the frame rate of the target application is greater than the preset speed, an abnormality appears in the presentation effect of the user interface of the target application. If decreasing speed of the frame rate of the target application is less than the preset speed, an abnormality does not appear in the presentation effect of the user interface of the target application. That is, the frame rate is decreased during the running stage and has a decreasing speed greater than a preset speed, and the decreasing speed greater than the preset speed indicates that the abnormality appears in the presentation effect of the user interface of the target application.

Alternatively, the terminal may obtain the frame rate of the target application in the following manner. The operating system in the terminal receives a function call request sent by the target application through the embedded SDK, and the function call request is used to request to call a specified function. The specified function is a function for monitoring the frame rate of the user interface presented in the terminal. Subsequently, the operating system calls the specified function according to the function call request to obtain the frame rate of the target application.

At block 803, the method detects whether a utilization rate of a hardware resource of the terminal reaches a preset upper-limit value in response to the abnormality appearing in the presentation effect of the user interface of the target application.

The hardware resource of the terminal refers to processing capabilities that hardware in the terminal has. The hardware resource of the terminal may include a central processing unit (CPU), a graphics processing unit (GPU), an input/output unit (I/O), and so on.

When there is only one type of hardware resource, the utilization rate of the hardware resource can be obtained as a ratio between available hardware resources and the total amount of hardware resources. When the hardware resource includes n types of hardware resources, the utilization rate of the hardware resource may be the maximum value of utilization rates of the n types of hardware resources, or the average value of utilization rates of the n types of hardware resources. For example, if the hardware resources include CPU, GPU, and I/O, and the utilization rate of CPU is 90%, the utilization rate of the GPU is 80%, and the utilization rate of the I/O is 70%, then the utilization rate of the hardware resources may be 90%, and can also be (90%+80%+70%)/3=80%. The utilization rate of each of the above hardware resources can also be obtained as a ratio between available hardware resources and the total amount of hardware resources.

The preset upper-limit value may be preset according to experiments or experience, which is not limited in the embodiments of the present disclosure. For example, the preset upper-limit value is 90%.

In some examples of the present disclosure, after detecting that an abnormality appears in the presentation effect of the user interface of the target application, the terminal also detects whether the utilization rate of the hardware resource has reached the upper-limit value, and then performs subsequent actions/operations to adjust the rendering strategy when the utilization rate of the hardware resources has reached the upper limit value. Thus, this can avoid a continuous abnormality in the presentation effect of the user interface of the target application under a case where the hardware resources have been used fully.

If an abnormality does not appear in the presentation effect of the user interface of the target application, the terminal can end the process to avoid rendering the user interface of the target application with different rendering strategies when it is unnecessary.

In addition, action/operation at block 803 is alternative, and the terminal may not perform the action/operation. That is, the terminal directly executes action/operation at block 804 when an abnormality appears in the presentation effect of the user interface of the target application.

At block 804, the method obtains a running stage in which the target application is located currently or go next in response to the utilization rate having reached the preset upper-limit value.

If the utilization rate does not reach the preset upper-limit value, more hardware resources will be allocated to render the user interface to be displayed in a running stage of the target application, so as to avoid an abnormality in the presentation effect of the user interface of the target application.

At block 805, the method generates a rendering strategy that is adapted to the running stage.

Figure 9:
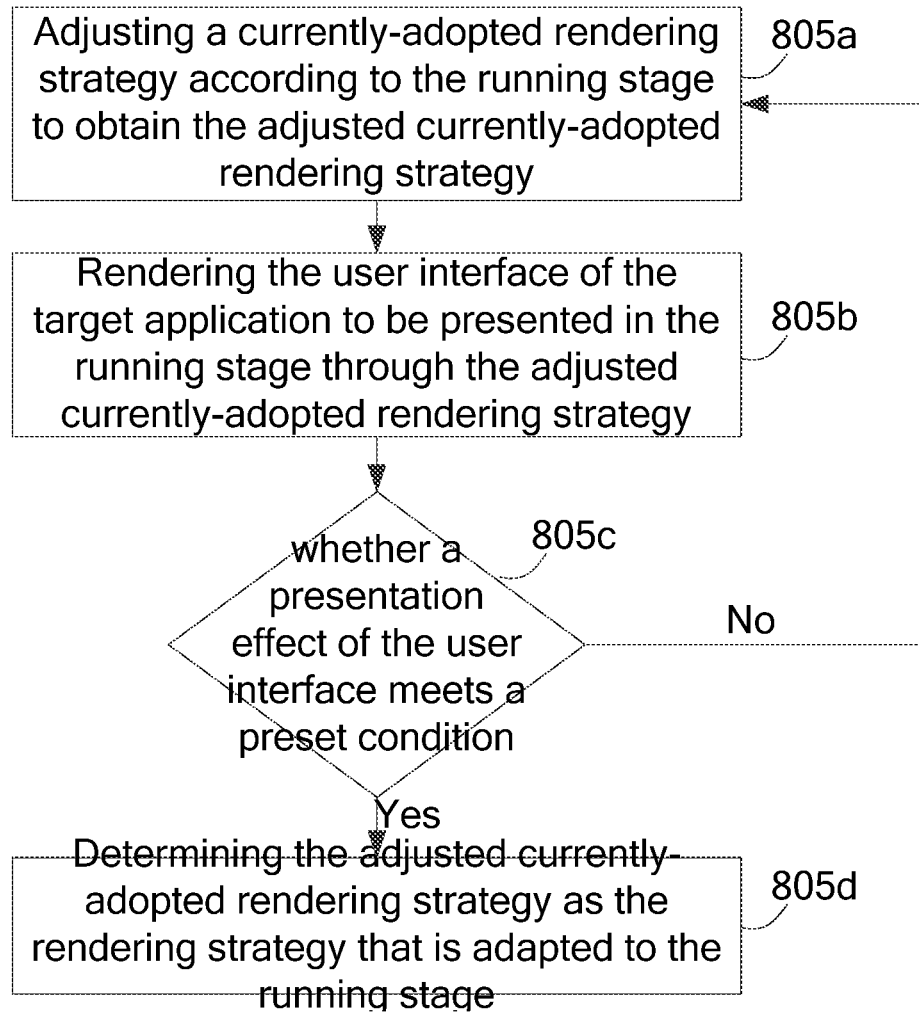
FIG. 9 is a flowchart of generating a rendering strategy according to some embodiments of the present disclosure.

In embodiments of the present disclosure, a rendering strategy that is adapted to a running stage refers to a rendering strategy that prevents an abnormality appearing in in the presentation effect in the above running stage of the target application. Alternatively, as shown in FIG. 9, the method includes actions/operations in the following sub-block regarding to generating a rendering strategy that is adapted to the running stage.

At block 805a, the method adjusts a currently-adopted rendering strategy according to the running stage to obtain the adjusted currently-adopted rendering strategy.

Alternatively, the terminal may adjust at least one of the rendering mode and the rendering parameters to adjust the currently-adopted rendering strategy. In a case where the terminal adjusts a rendering mode of a rendering strategy to adjust the rendering strategy, a currently-adopted rendering mode can be replaced with a rendering mode that occupies less hardware resources of the terminal. In a case where the terminal adjusts a rendering strategy by adjusting rendering parameters of the rendering strategy, the terminal can reduce resolution of the user interface of the target application, and can also reduce the number of RGB color channels.

At block 805b, the method renders the user interface of the target application to be presented in the running stage through the adjusted currently-adopted rendering strategy.

At block 805c, the method detects whether a presentation effect of the user interface meets a preset condition.

In some embodiments of the present disclosure, the preset condition means that an abnormality does not appear in the presentation effect of the user interface. In some examples, the preset condition includes the frame rate of the target application being increased to a preset frame rate. In another some examples, the preset condition includes the frame rate of the target application stopping to decrease. In another some examples, the preset condition includes that the frame rate of the target application has a decreasing speed less than a preset speed.

If the presentation effect of the user interface does not meet the preset condition, action/operation at block 805a is started to be executed, and if the presentation effect of the user interface meets the preset condition, action/operation at block 805d is performed.

At block 805d, the method determines the adjusted currently-adopted rendering strategy as the rendering strategy that is adapted to the running stage.

At block 806, the method renders the user interface of which the target application is to be presented in the running stage through the rendering strategy.

In summary, in the technical solution according to the embodiments of the present disclosure, a rendering strategy that is adapted to a running stage in which an application is located currently or go next is further generated when an abnormality appears in the presentation effect of a user interface of the application, and the user interface of the application is rendered through the rendering strategy. Thus, this can avoid a continuous abnormality in the presentation effect of the user interface of the application.

Meanwhile, when an abnormality appears in the presentation effect of the user interface of the target application has, and the utilization rate of the hardware resources has reached the upper-limit, subsequent actions/operations are performed to adjust the rendering strategy. Thus, this can avoid a continuous abnormality in the presentation effect of the application under a case where the hardware resources have been used fully.

In some alternative embodiments based on an embodiment shown in FIG. 7 or FIG. 8, after generating a rendering strategy adapted to a running stage, the terminal may also store the running stage and a relationship between the running stage and the rendering strategy that is adapted to the running stage. When the target application subsequently enters the running stage again, the rendering strategy adapted to the running stage may be found directly from the previously-stored relationship, without being regenerated. This can efficiently obtain the rendering strategy adapted to the running stage and saves processing resources of the terminal.

The method for rendering a user interface shown in FIG. 7 or FIG. 8 is explained below by taking the target application being a game application as an example. When an abnormality appears in the presentation effect when a game application 'A' is in a mirror-opening stage, and the hardware resources of the terminal have reached the upper limit value, the terminal adjusts the rendering strategy. Taking adjusting resolution as an example, the terminal adjusts the resolution of the game application 'A' from 1080p to 720p. If an abnormality still appears in the presentation effect, the resolution of the game application 'A' is reduced continuously until no abnormality appears in the presentation effect of the game application 'A'.

Embodiments of an apparatus of the present disclosure are as follow, which can be used to execute the method of embodiments of the present disclosure. For details not disclosed in the apparatus of embodiments of the present disclosure, please refer to the method of embodiments of the present disclosure.

Figure 10:
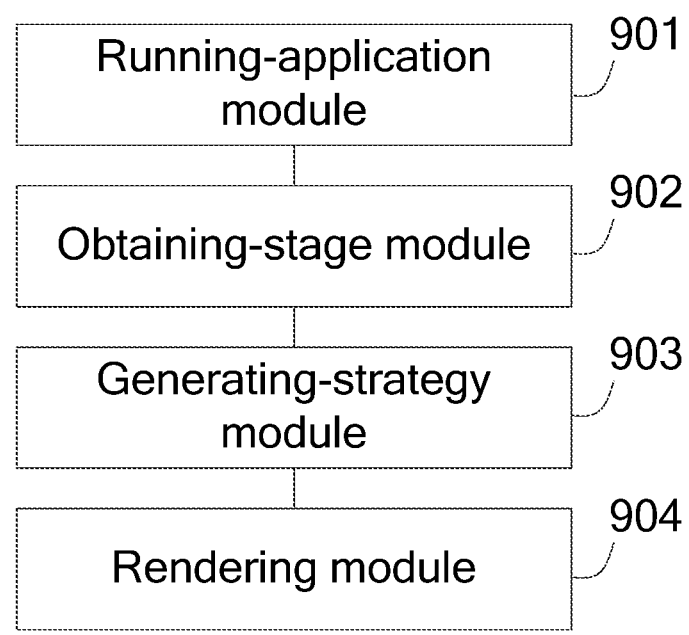
FIG. 10 is a block diagram of an apparatus for rendering a user interface according to some embodiments of the present disclosure.

FIG. 10 shows a block diagram of an apparatus for rendering a user interface according to some embodiments of the present disclosure. The apparatus has a function to realize the above method, and the function may be realized by hardware, or may be realized by hardware executing a corresponding software. The apparatus may include a running-application module 901, an obtaining-stage module 902, a generating-strategy module 903, and a rendering module 904.

The running-application module 901 is configured for running a target application.

The obtaining-stage module 902 is configured for obtaining a running stage in which the target application is located currently or go next.

The generating-strategy module 903 is configured for generating a rendering strategy that is adapted to the running stage.

The rendering module 904 is configured for rendering the user interface of which the target application is to be presented in the running stage through the rendering strategy.

To sum up, in the technical solution according to the embodiments of the present disclosure, the running stage in which the target application is located currently or go next is obtained, and then the user interface to be presented in the above running stage is rendered through a rendering strategy that is adapted to the above running stage. Thus, the rendering strategy can be dynamically adjusted at different running stages, and different presentation effects are accordingly presented, which improves the controllability and flexibility of interface rendering.

In some alternative embodiments according to the embodiment in FIG. 10, the generating-strategy module 903 is configured for the following.

Adjusting a currently-adopted rendering strategy according to the running stage to obtain the adjusted currently-adopted rendering strategy.

Rendering the user interface of which the target application is to be presented in the running stage through the adjusted currently-adopted rendering strategy.

Detecting whether a presentation effect of the user interface meets a preset condition;

Reperforming the adjusting the currently-adopted rendering strategy according to the running stage in response to the presentation effect of the user interface not meeting the preset condition.

Determining the adjusted currently-adopted rendering strategy as the rendering strategy that is adapted to the running stage in response to the presentation effect of the user interface meeting the preset condition.

In some alternative embodiments according to the embodiment in FIG. 10, the apparatus further includes a first detecting module (not shown in drawings).

The first detecting module is configured for detecting whether an abnormity appears in a presentation effect of the user interface of the target application.

The obtaining-stage module 902 is further configured for obtaining the running stage in which the target application is located currently or go next in response to the abnormity appearing in the presentation effect of the target application.

Alternatively, the first detecting module is configured for the following.

Obtaining a frame rate at which the target application is running.

Detecting whether the abnormity appears in the presentation effect of the user interface of the target application according to the frame rate at which the target application is running.

Alternatively, the apparatus further includes the following.

A second detecting module, which is configured for detecting whether a utilization rate of a hardware resource of a terminal reaches a preset upper-limit value in response to the abnormity appearing in the presentation effect of the user interface of the target application.

The obtaining-stage module 902 is configured for obtaining the running stage in which the target application is located currently or go next in response to the utilization rate reaching the preset upper-limit value.

In some alternative embodiments according to the embodiment in FIG. 10, the apparatus further includes a storing module (not shown in drawings).

The storing module is configured for storing the running stage and a relationship between the running stage and the rendering strategy that is adapted to the running stage.

In some alternative embodiments according to the embodiment in FIG. 10, the obtaining-stage module 902 is configured for the following.

Obtaining the running stage through a data channel established with the target application.

Alternatively, the data channel is established in a Binder manner by which the target application calls an embedded software development kit (SDK) with an operating system; or the data channel is a long connection established between the target application and the operating system in a Socket manner.

In some alternative embodiments according to the embodiment in FIG. 10, the running stage is determined according to at least one of a running duration of the target application and contents in the user interface presented by the target application.

It should be noted that, the division of the above function modules is just an example to be described when the apparatus according to the above embodiments realizes its functions. In practical applications, the above functions can be allocated to different function modules to implement according to needs. That is, the internal structure of a device is divided into different function modules to complete all or part of the functions as described above. In addition, the apparatus according to the above embodiments belong to the same concept with that of the method according to embodiments. The specific implementation of the apparatus may refer to the method, which is not described in detail here.

Example embodiments of the present disclosure further provide a computer-readable storage medium storing a computer program, and when the computer program is loaded and executed by a processor, the method for rendering a user interface in the foregoing embodiments is implemented.

Example embodiments of the present disclosure further provide a computer program product containing instructions, which when executed on a computer, causes the computer to execute the method for rendering a user interface in the foregoing embodiments.

It should be understood that the "a plurality of" herein refers to two or more. "and/or" describes a relationship between related objects, indicating that there can be three relationships. For example, A and/or B can indicate that A exists alone, A and B exist simultaneously, and B exists alone. The character "I" generally indicates a "or" relationship between related objects.

The sequence numbers of the above embodiments of the present disclosure are for description only, and do not represent embodiments with advantages and disadvantages.

The above are only example embodiments of the present disclosure and are not intended to limit the present disclosure. Any modification, equivalent replacement, and improvement made within the spirit and principles of the present disclosure should be included in the protection scope of the present disclosure.

What is claimed is:

1. A method for rendering a user interface, comprising:
running a target application;
obtaining a frame rate at which the target application is running;
detecting an abnormity appearing in a presentation effect of the user interface of the target application in response to the frame rate decreasing during a running stage and having a decreasing speed that is greater than a preset speed;
obtaining the running stage that the target application is currently located at or the target application will next enter in response to the abnormity appearing in the presentation effect of the target application, wherein the running stage is a duration in which the target application runs;
generating a rendering strategy that is adapted to the running stage, wherein the rendering strategy comprises at least one of a rendering mode or rendering parameters, wherein the rendering mode is selected from multiple rendering modes stored in a terminal to meet different needs of users and requiring different hardware resources of the terminal, rendering efficiencies, and presentation effects, and wherein the rendering parameters are parameters with which the user interface is rendered; and
rendering the user interface of which the target application is to be presented in the running stage through the rendering strategy.

2. The method as claimed in claim 1, wherein generating the rendering strategy that is adapted to the running stage comprises:
adjusting a currently-adopted rendering strategy according to the running stage to obtain the adjusted currently-adopted rendering strategy;
rendering the user interface of which the target application is to be presented in the running stage through the adjusted currently-adopted rendering strategy;
detecting whether a presentation effect of the user interface meets a preset condition wherein the preset condition is when an abnormity does not appear in the presentation effect of the user interface;
reperforming the adjusting the currently-adopted rendering strategy according to the running stage in response to the presentation effect of the user interface not meeting the preset condition; and
determining the adjusted currently-adopted rendering strategy as the rendering strategy that is adapted to the running stage in response to the presentation effect of the user interface meeting the preset condition.

3. The method as claimed in claim 1, wherein the target application is installed in a terminal, and the method further comprises:
detecting whether a utilization rate of a hardware resource of the terminal reaches a preset upper-limit value in response to the abnormity appearing in the presentation effect of the user interface of the target application;
wherein obtaining the running stage is performed in response to the utilization rate reaching the preset upper-limit value.

4. The method as claimed in claim 1, further comprising:
after the generating the rendering strategy that is adapted to the running stage,
storing the running stage and a relationship between the running stage and the rendering strategy that is adapted to the running stage.

5. The method as claimed in claim 4, wherein the data channel is established in a Binder manner by which the target application calls an embedded software development kit (SDK) with an operating system; or
the data channel is a long connection established between the target application and the operating system in a Socket manner.

6. The method as claimed in claim 1, wherein obtaining the running stage that the target application is currently located at or the target application will next enter comprises:
obtaining the running stage through a data channel established with the target application.

7. The method as claimed in claim 1, wherein the running stage is determined according to at least one of a running duration of the target application and contents in the user interface presented by the target application.

8. A terminal, comprising a processor and a non-transitory memory, the non-transitory memory storing a computer program, when loaded and executed by the processor, the computer program causing the processor to perform:
running a target application;
obtaining a frame rate at which the target application is running;
detecting an abnormity appearing in a presentation effect of the user interface of the target application in response to the frame rate decreasing during a running stage and having a decreasing speed that is greater than a preset speed;
obtaining the running stage that the target application is currently located at or the target application will next enter in response to the abnormity appearing in the presentation effect of the target application, wherein the running stage is a duration in which the target application runs;
generating a rendering strategy that is adapted to the running stage, wherein the rendering stage comprises at least one of a rendering mode or rendering parameters, wherein the rendering mode is selected from multiple rendering modes stored in a terminal to meet different needs of users and requiring different hardware resources of the terminal, rendering efficiencies, and presentation effects, and wherein the rendering parameters are parameters with which the user interface is rendered; and
rendering the user interface of which the target application is to be presented in the running stage through the rendering strategy.

9. The terminal as claimed in claim 8, wherein the terminal has a hardware resource; and
the obtaining the running stage is performed in response to the abnormity appearing in the presentation effect of the target application and a utilization rate of the hardware resource reaching a preset upper-limit value.

10. The terminal as claimed in claim 8, wherein the running stage and a relationship between the running stage and the rendering strategy that is adapted to the running stage are stored in the non-transitory memory.

11. The terminal as claimed in claim 8, wherein the running stage is obtained through a data channel established with the target application.

12. The terminal as claimed in claim 11, wherein the data channel is established in a Binder manner by which the target application calls an embedded software development kit (SDK) with an operating system; or
the data channel is a long connection established between the target application and the operating system in a socket manner.

13. The terminal as claimed in claim 8, wherein the running stage is determined according to at least one of a running duration of the target application and contents in the user interface presented by the target application.

14. A non-transitory storage medium, storing a computer program, when loaded and executed by a processor, the computer program causing the processor to perform:
- running a target application;
- obtaining a frame rate at which the target application is running;
- detecting an abnormity appearing in a presentation effect of the user interface of the target application in response to the frame rate decreasing during a running stage and having a decreasing speed that is greater than a preset speed;
- obtaining the running stage that the target application is currently located at or the target application will next enter in response to the abnormity appearing in the presentation effect of the target application, wherein the running stage is a duration in which the target application runs;
- generating a rendering strategy that is adapted to the running stage, wherein the rendering strategy comprises at least one of a rendering mode or rendering parameters, wherein the rendering mode is selected from multiple rendering modes stored in a terminal to meet different needs of users and requiring different hardware resources of the terminal, rendering efficiencies, and presentation effects, and wherein the rendering parameters are parameters with which the user interface is rendered; and
- rendering the user interface of which the target application is to be presented in the running stage through the rendering strategy.

* * * * *